United States Patent [19]

Krechel et al.

[11] 4,076,211
[45] Feb. 28, 1978

[54] BALL VALVE

[75] Inventors: Joseph L. Krechel, Chesterfield; Michael J. Purvis, Maplewood, both of Mo.

[73] Assignee: Control Devices, Incorporated, St. Louis, Mo.

[21] Appl. No.: 621,956

[22] Filed: Oct. 14, 1975

[51] Int. Cl.² .............................................. F16K 5/06
[52] U.S. Cl. ................................... 251/286; 251/309; 251/315
[58] Field of Search ........................ 251/309, 315, 286

[56] References Cited

U.S. PATENT DOCUMENTS

| | | | |
|---|---|---|---|
| 1,384,159 | 7/1921 | Schenker | 251/286 |
| 2,825,527 | 3/1958 | Wendell | 251/315 X |
| 2,839,074 | 6/1958 | Kaiser | 251/315 X |
| 3,563,265 | 2/1971 | Graham | 251/315 X |
| 3,635,439 | 1/1972 | McNally | 251/315 |
| 3,779,509 | 12/1973 | Vandenbroek | 251/315 X |
| 3,860,032 | 1/1975 | Rogers | 251/315 X |
| 3,897,933 | 8/1975 | Christenot | 251/309 X |
| 3,960,365 | 6/1976 | Horowitz | 251/286 |

Primary Examiner—Alan Cohan
Assistant Examiner—Gerald A. Michalsky
Attorney, Agent, or Firm—Koenig, Senniger, Powers and Leavitt

[57] ABSTRACT

A ball valve having a valve body, a main flow passage therethrough, a lateral bore extending generally perpendicularly through the passage, and a unitary ball valve member received in the lateral bore. The ball valve member has a spherical ball portion with an aperture therethrough and a pair of circular sealing heads, one on each side of the ball portion. Each of the sealing heads carries a seal which is slidably and sealingly engageable with the walls of the lateral bore. The sealing heads are of substantially equal diameter so that pressure forces acting on the ball valve member which tend to move the latter axially within the bore are balanced. A seal body is insertable into a main flow passage of the valve body from one end thereof for sealingly engaging the ball portion after the ball valve member has been installed in the lateral bore.

6 Claims, 4 Drawing Figures

BALL VALVE

BACKGROUND OF THE INVENTION

This invention relates to a valve and more particularly to a combination valve and manifold assembly for a compressed air storage tank or the like.

Generally, it is desirable that a compressed air storage tank have as few openings as possible therein. However, it is often necessary to provide ports for a pressure gauge and for a safety relief valve as well as a main air outlet. Heretofore, manifold assemblies were known which provided a main air outlet, a shutoff valve for the outlet, and other outlet ports for connection of a pressure gauge, a pressure relief valve, or the like. In one of these prior art manifold assemblies, such as shown in U.S. Pat. No. 3,231,236, a slide valve is used to block the flow from the main outlet. This slide valve is, however, subject to wear and leakage and it severely restricts flow through the main outlet.

In the manifold assembly of the present invention, a ball valve is used as the flow shutoff valve. The advantages of ball valves (i.e., low pressure drop and high flow through the valve, and the fast opening and closing action of the valve) are well known. However, known ball valves, when subjected to fluid pressure often bind in their valve seats. It is also necessary that the ball valve member be sealingly mated with its valve seat. In some ball valves, unequal pressure forces exerted on opposite sides of the ball valve member caused it to bind on its valve seat and to unevenly contact its seat thus resulting in leakage, and made the valve difficult to operate. In some instances, these unbalanced pressure forces caused damage to the valve. Also, the seals and the construction of many ball valve designs are complicated.

SUMMARY OF THE INVENTION

Among the several objects of this invention may be noted the provision of a ball valve which has a minimal number of parts and seals; the provision of such a valve which does not stick or bind in its valve body when subjected to relatively high operating pressures; the provision of such a valve in which its seals are not subject to damage upon turning of the valve; the provision of an outlet manifold assembly for a compressed-air tank or the like incorporating one of the above-mentioned ball valves for use as a shut-off valve; the provision of such a manifold assembly which has a relatively low pressure drop therethrough and which enables high flow rates therethrough; the provision of such a manifold assembly which may be molded of synthetic resin material and which is not subject to corrosion; the provision of such a manifold assembly which may be readily adjusted to infinitely vary the flow rate therethrough and which may be readily and reliably opened and closed; the provision of such a manifold assembly which is of light weight, inexpensive to manufacture, easy to install, and reliable in operation. Other objects and features of this invention will be in part apparent and in part pointed out hereinafter.

Briefly, a valve of this invention comprises a valve body having a main flow passage therethrough and a bore of generally circular cross-section in the valve body extending generally perpendicularly through the passage, one end of the passage constituting an inlet and the other end of the passage constituting an outlet. A unitary ball valve member is received in the bore, this ball valve member being rotatable between a closed position in which it blocks flow through the flow passage and an open position in which it permits flow through the flow passage. The ball member comprises a generally spherical ball portion having an aperture therethrough constituting a portion of the flow passage when the ball valve member is in its open position, and a pair of circular sealing heads, one on each side of the ball portion. Each of the sealing heads carries a seal which slidably, sealingly engages the walls of the bore so as to seal the ball valve member relative to the valve body and to permit rotation of the ball valve member within the bore between its opened and closed positions. The sealing heads are of substantially the same diameter so that pressure forces acting on the ball valve member which tend to move the latter axially within the bore are balanced. Means is provided for retaining the ball valve member in the bore, this retaining means permitting limited axial movement of the ball valve member in the bore. The valve further includes seal means insertable into the flow passage from one end thereof, the seal means comprising a seal body having a longitudinal bore therethrough constituting a portion of the flow passage, and an end seal carried on the inner end of the seal body engageable with the ball portion for preventing leakage around the ball portion to the outlet when the ball valve member is in its closed position, and a packing seal carried on the side of the seal body sealingly engageable with the valve body so as to prevent leakage between the valve body and the seal body.

BRIEF DESCRIPTION OF THE DRAWINGS

Corresponding reference characters indicate corresponding parts throughout the several views of the drawings.

DESCRIPTION OF A PREFERRED EMBODIMENT

Figure 2:
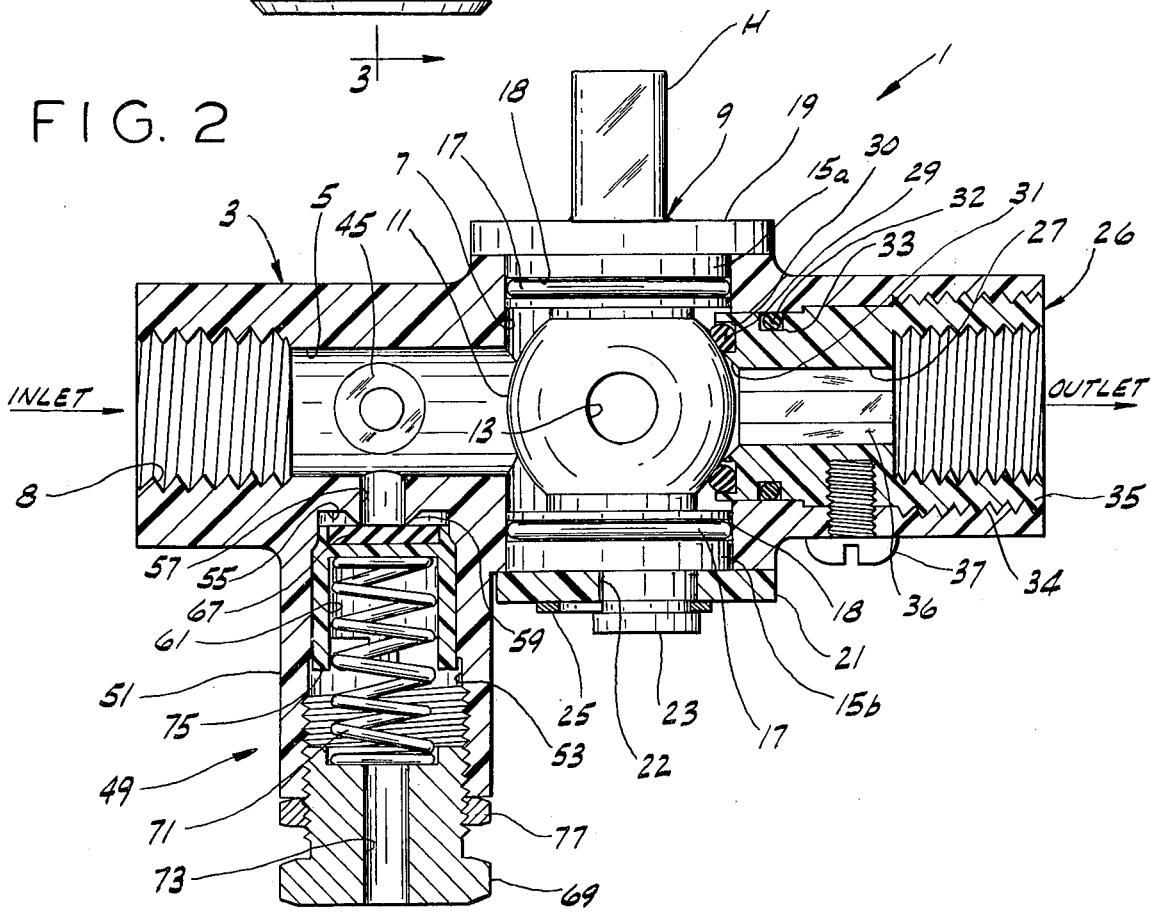
FIG. 2 is a longitudinal cross-section taken on line 2—2 of FIG. 1 of the manifold assembly showing a ball-type shutoff valve, the latter being shown in its closed position blocking flow through the manifold assembly.

Referring now to the drawings, a valve of this invention, generally indicated at 1, is shown to comprise a valve body 3 (also referred to as a manifold body) having a longitudinal bore 5 therethrough, portions of which constitute a main flow passage through the valve body and a lateral bore 7 (see FIG. 2) of generally circular cross-section extending generally perpendicularly through bore 5. One end of bore 5 (i.e., the left end as shown in FIG. 2) constitutes an inlet end and the other end thereof constitutes an outlet end. The inlet end of bore 5 is threaded, as indicated at 8, for being installed on a male nipple (not shown) of an air compressor tank or the like (also not shown) whereby compressed air or other fluid enters the inlet end of the bore (as shown by the arrows in FIG. 2). As generally indicated at 9, a unitary ball valve member is received within bore 7 for rotation between a closed position (as shown in FIG. 2) in which it blocks flow through bore 5 and an open position (not shown) in which it permits flow through the bore. Thus, this ball valve constitutes a shutoff valve. Ball valve member 9 comprises a generally spherical ball portion 11 having an aperture 13 therethrough. This aperture is in alignment with bore 5 when the ball valve member is in its open position and thus constitutes a portion of the main flow passage through which air and other fluid may flow through valve 1 with minimal restriction by the ball valve. The ball valve member further includes a pair of circular heads 15a, 15b, one on each side of ball portion 11. Each of these heads carries an O-ring seal 17 in a circumferential groove 18 with the O-ring slidably, sealingly engaging the wall of bore 7 so as to seal the ball valve member relative to the valve body and to permit rotation of the ball valve member about the longitudinal axis of bore 7 between its opened and closed positions. Sealing heads 15a, 15b are of substantially the same diameter (i.e., the diameter of bore 7) so that the pressure forces within valve body 3 acting on the ball valve member which tend to move the latter axially within bore 7 are balanced. This feature permits the ball valve member to readily be rotated when subjected to pressure without sticking or binding in bore 7 and it insures that the ball portion will remain seated on its seals.

As is indicated at 19, a fixed flange is provided at one end of valve member 9 on the outside of head 15a and a stem 23 of part-circular cross-section extends from ball portion 11 opposite flange 19. A retainer disk 21 having a part-circular opening 22 therein is keyed on stem 23 and is removably secured in place on the stem by a snap ring 25. Thus, flange 19 and disk 21 retain the ball valve member within bore 7, but the clearances between flange 19 and body 3 and between disk 21 and the body permit limited axial movement of the ball valve member within the bore for purposes as will appear.

A seal member, as generally indicated at 26, is insertable (i.e., threadable) into bore 5 from one end thereof (e.g., the right or outlet end of bore 5 as shown in FIG. 2). Seal member or body 26 has an axial bore 27 therethrough constituting a portion of the main flow passage, and it has an O-ring seal 29 carried in annular groove 30 on its inner end surrounding bore 27. As indicated at 31, the inner end of seal body 26 surrounding bore 27 is tapered to accommodate a portion of spherical ball portion 11 and to protect O-ring seal 29 from damage (i.e., from being cut or pinched) as the ball valve member is opened and closed to move aperture 13 over the O-ring. Seal body 26 further has a circumferential packing O-ring seal 32 received in a groove 33 on the outer surface of the seal member adjacent its inner end. Seal member 26 is threaded into bore 5 after installation of ball valve member 9 in lateral bore 7 so that seal 29 sealingly engages the spherical surface of ball portion 11 thereby to prevent leakage around the ball portion to the outlet end of passage 5 when the ball valve member is in its closed position. Packing seal 32 sealingly engages the valve body downstream from bore 7 so as to prevent leakage between seal member 26 and the valve body. As previously mentioned, ball valve member 9 is permitted to move axially in bore 7 through a limited distance by retaining flange 19 and retaining disk 21. This permits the valve member to move axially within bore 7 to a position in which the ball portion 11 is uniformly sealingly seated on end O-ring seal 29. Because the pressure forces on the ball valve member are balanced, there is little tendency for the seal to leak. It will be noted that only one seal engageable with the ball portion 11 is required to seal the ball valve member relative to the main flow passage. Thus, either end of bore 5 could constitute an inlet.

Figure 1:
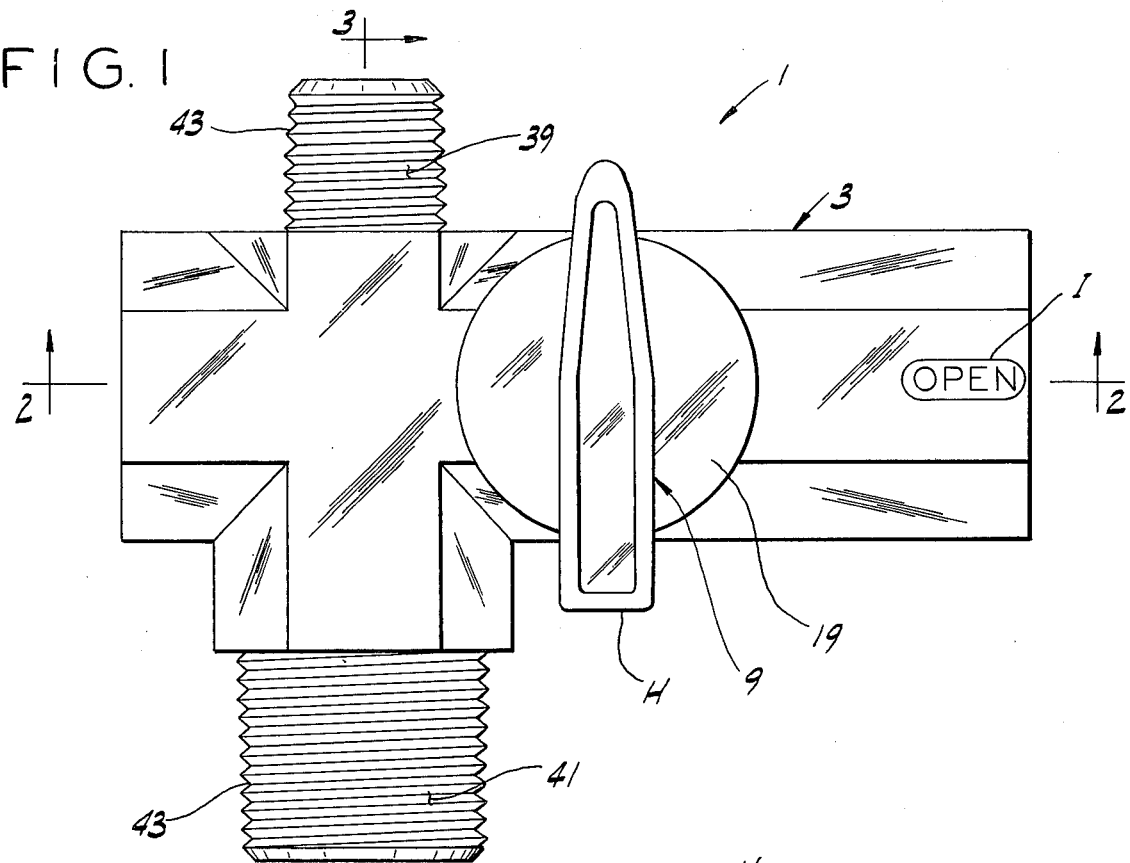
FIG. 1 is a plan view of a manifold assembly of this invention.
Figure 4:
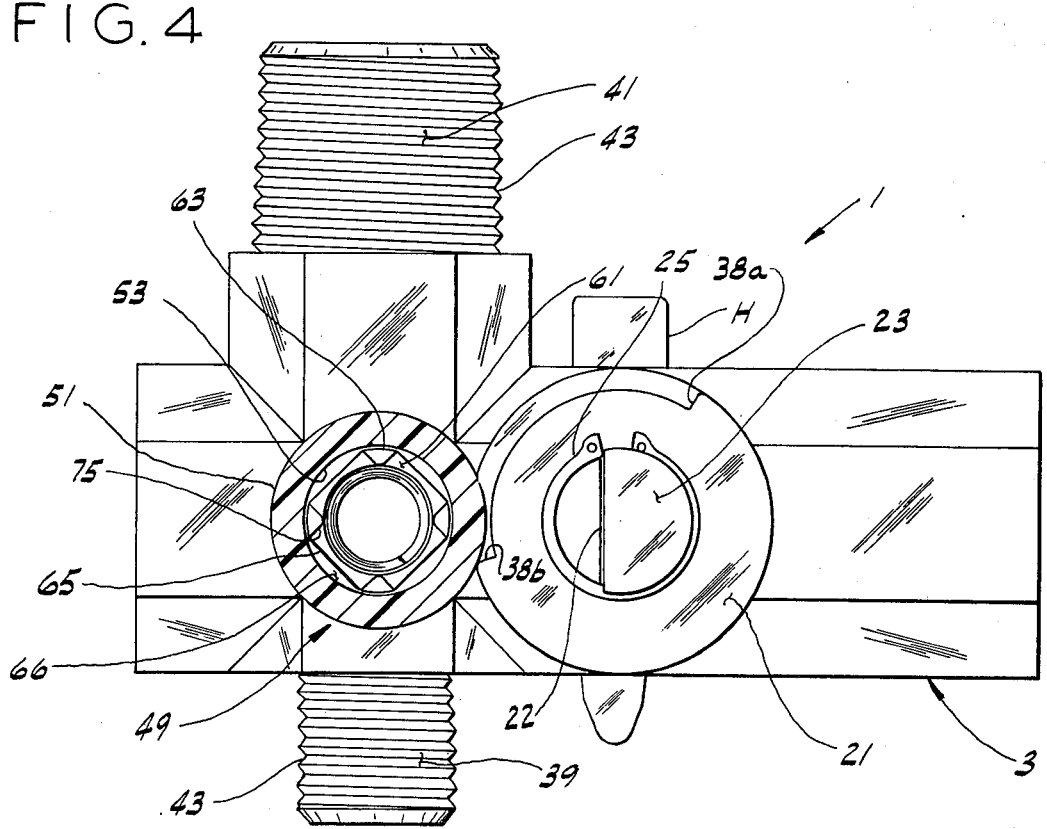
FIG. 4 is a bottom view of the manifold assembly shown in FIG. 1 with a portion of the manifold assembly shown in cross-section to illustrate details of an overpressure safety relief valve.

As indicated at H, ball valve member 9 has a handle for facilitating manual turning of the ball valve member between its closed and opened positions. Preferably, valve body 3, ball valve member 9, disk 21, and seal member 26 are molded of suitable synthetic resin material. The outlet end of bore 5 in valve body 3 is internally threaded as indicated at 34, and seal body 26 has external threads 35 thereon threadably engageable with threads 34. As indicated at 36, bore 27 in seal member 26 is of hexagonal cross-section so as to receive a driving wrench for threading the seal member into the outlet end of bore 5 and valve body 3. After seal body 26 has been properly positioned in bore 5 with its inner end seal 29 seated on ball portion 11 of ball valve member 9, a screw 37 is threaded into the seal body through valve body 3 thereby to fixedly hold the seal body in the valve body. Disk 21 has two spaced stops 38a, 38b (see FIG. 4) positioned on opposite sides of a portion of valve body 3 for engaging the above-mentioned portion of the valve body as the valve member is turned between its open and closed positions. Thus, these stops permit limited rotation (e.g., approximately 90°) of the valve member so as to insure that the valve member may not be rotated past its opened and closed positions. Valve body 3 carries indicia, as indicated at I, for indicating the position of the ball valve member (see FIG. 1). With valve 1 molded of synthetic resin material, corrosion of the valve is substantially eliminated and sealing tape or other sealant is not required for insuring leaktight connections of the valve.

Further in accordance with this invention, valve 1 is shown to be a part of a manifold assembly for an air compressor storage tank (not shown) or the like. Valve or manifold body 3 is shown to have two outlet nipples 39 and 41 in communication with bore 5 within the valve body intermediate lateral bore 7 and the inlet end of bore 5. As indicated at 43, these nipples have external screw threads thereon for connection thereto of a pressure gauge, a pressure actuated switch for controlling operation of an air compressor, or the like. Each of these nipples has a respective tubular metal stiffener 45, 47 (see FIG. 3) pressed into the bore of each nipple to provide additional strength for the nipples to enable them to resist bending and shock loading.

Figure 3:
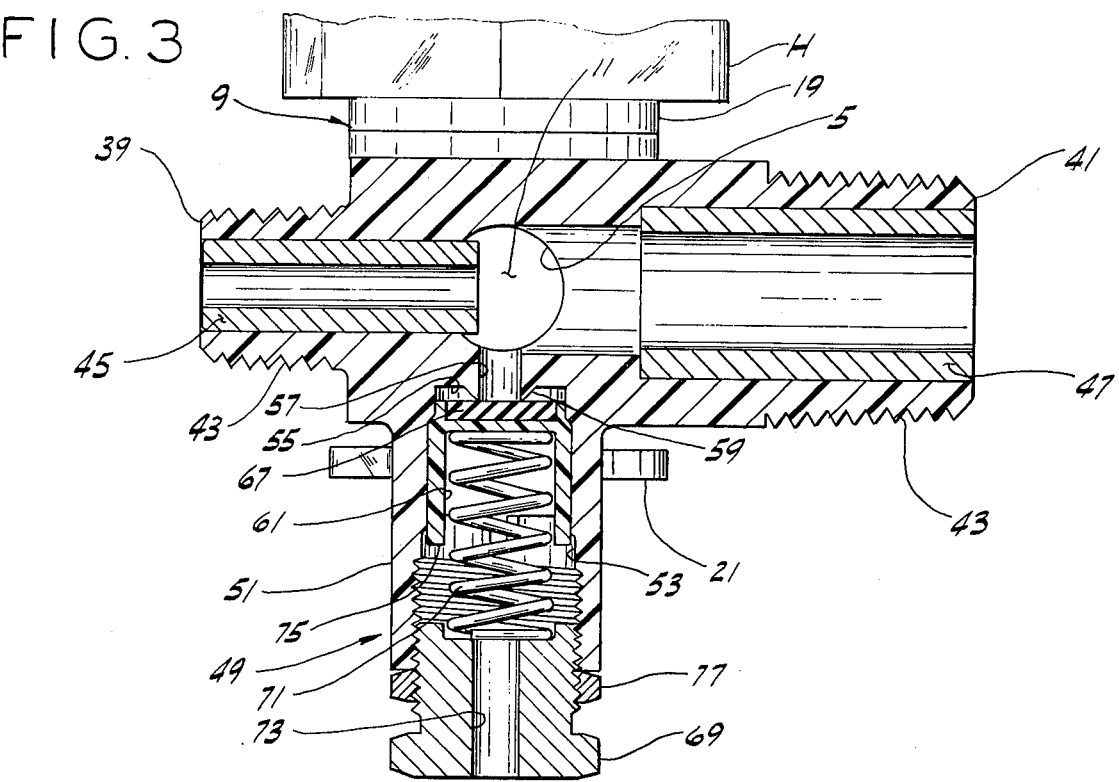
FIG. 3 is a vertical cross section of the manifold assembly taken on line 3—3 of FIG. 1.

As generally indicated at 49 in FIGS. 2 and 3, a safety pressure relief valve is provided in the manifold assembly of this invention for relieving pressure from within longitudinal bore 5 of valve body 3 upstream from bore 7. It will be understood that with valve body 1 installed on an air compressor storage tank or the like, safety pressure relief valve 49 will automatically relieve pressure from within the tank upon the pressure exceeding a predetermined pressure level. As indicated at 51, a boss is formed on valve body 5 having a blind chamber 53 therein. This chamber has a base 55 having a port 57 therein in communication with bore 5 upstream (i.e., toward the inlet end of bore 5) from bore 7. An annular raised seat 59 surrounds this port. A poppet valve 61 is housed in chamber 53, this poppet member being of generally polygonal (i.e., square) cross-section (see FIG. 4) and having rounded corners 63 which slidably engage the inner walls of the chamber and flat sides 65 spaced from the inner walls of the chamber thereby to provide channels or passages 66 for exhausting fluid (e.g., air) from port 57 when the poppet valve is clear of valve seat 59. As indicated at 67, a resilient pad of suitable elastomeric material or the like is carried on the bottom face of the poppet valve member and is sealingly engageable with seat 59 thereby to seal the valve member relative to the seat when the valve member is closed. A plug nut 69 is threaded into the open end of chamber 53 and a compression coil spring 71 is interposed between poppet valve member 61 and the plug nut so as to bias the former toward its closed position in which it is seated on valve seat 59 to block flow from port 57. Upon pressure in bore 5 increasing above the predetermined level, a pressure force is exerted on the poppet valve member sufficient to overcome the bias of spring 71 and to open the poppet valve member (i.e., move it clear of valve seat 59) thereby to permit air to be vented from port 57. Plug nut 69 has a vent port 73 through which air vented from 57 is exhausted to atmosphere. It will be understood that plug nut 69 and boss 51 are so structured that the plug nut cannot be threaded into chamber 53 so as to fully compress the coils of the spring 71 to rigidly hold the poppet valve member in its closed position against valve seat 59. As indicated at 75, poppet valve member 61 has lugs at each of its corners 63 which extend endwise from the poppet valve member toward the plug nut. Lugs 75 are of such length as to engage the inner end face of plug nut 69 as the poppet valve member is moved from its seat 59 so as to prevent the coils of spring 71 from being fully compressed and to prevent the poppet valve member from sealingly engaging the inner end of the plug nut. This insures that upon the pressure in bore 5 exceeding the above-mentioned predetermined pressure level, the poppet valve member will open and air will be vented through port 57 to flow around the flat sides 65 of the poppet valve member, between lugs 75, through the coils of spring 71, and out vent port 73 in plug nut 69.

Plug nut 69 may be adjustably threaded into and out of chamber 53 thereby to vary the compression or preload of spring 71. By selectively varying the preload on the spring, the pressure level in bore 5 which effects opening of poppet valve member 61 may be adjusted or calibrated. A stop nut 77 is threaded on plug nut 69. With the plug nut in a desired position, stop nut 77 may be threaded down to engage the outer end of boss 51 thereby to lock the plug nut in position. It will be understood that relief valve 49 may be calibrated at the factory to relieve pressure at a specified level.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A valve comprising a valve body having a main flow passage therethrough and a bore of generally circular cross-section in said valve body extending generally perpendicularly through said passage, one end of said passage constituting an inlet and the other end of said passage constituting an outlet, a unitary ball valve member received in said bore, said ball valve member being rotatable about the longitudinal axis of said bore between a closed position in which it blocks flow through said flow passage and an open position in which it permits flow through said flow passage, said ball valve member comprising a generally spherical ball portion having an aperture therethrough constituting a portion of said flow passage when said ball valve member is in its open position, and a pair of circular sealing heads, one on each side of said ball portion, each of said sealing heads carrying a seal which slidably, sealingly engages the walls of said bore so as to seal said ball valve member relative to said valve body and to permit rotational and axial movement of said ball valve member within said bore, said sealing heads being of substantially the same diameter so that pressure forces acting on said ball valve member which tend to move the latter axially within said bore are balanced, means external to said valve body at each end of said ball valve member for retaining said ball valve member in said bore and for permitting limited axial movement of said ball valve member in said bore by engagement with said valve body, and seal means insertable in said flow passage from one end thereof, said seal means comprising a body having a longitudinal bore therethrough constituting a portion of said flow passage, and an end seal carried on the inner end of said seal body engageable with said ball portion, said retaining means permitting limited axial movement of said ball valve member in said bore to a position in which said end seal is sealingly seated on said spherical ball portion for preventing leakage around said ball portion to said outlet when said ball valve member is in its closed position.

2. A valve as set forth in claim 1 wherein each of said sealing heads has a circumferential groove therearound and an O-ring received in said groove constituting said seal carried by said sealing head.

3. A valve as set forth in claim 1 further comprising means for fixedly securing said seal body relative to said valve body.

4. A valve as set forth in claim 3 wherein said securing means comprises a screw threaded through a portion of said valve body for engagement with said seal body.

5. A valve as set forth in claim 1 wherein said ball valve member further includes a handle at one end thereof, and a stem portion extending endwise from the other end of said ball valve member for extending out beyond said valve body when said ball valve member is received within said bore, and wherein said retaining means comprises a flange at said one end of said ball valve member adjacent said handle engageable with said valve body so as to limit inward movement of the ball valve member into the bore and a removable flange releasably secured to said stem portion when said ball valve member is received in said bore and engageable with said ball valve body to prevent removal of said ball valve member from said bore.

6. A valve as set forth in claim 5 wherein said removable flange includes means for limiting the rotation of said ball valve member substantially between its open and closed positions.

* * * * *